July 24, 1962　　　K. E. HANKINS　　　3,046,177
METHOD OF APPLYING POLYURETHANE FOAM TO THE
BACKS OF CARPETS AND EQUIPMENT THEREFOR
Filed March 31, 1958　　　　　　　　　　　　4 Sheets-Sheet 1

INVENTOR
KENNETH E. HANKINS
BY
ATTORNEYS

July 24, 1962 K. E. HANKINS 3,046,177
METHOD OF APPLYING POLYURETHANE FOAM TO THE
BACKS OF CARPETS AND EQUIPMENT THEREFOR
Filed March 31, 1958 4 Sheets-Sheet 2
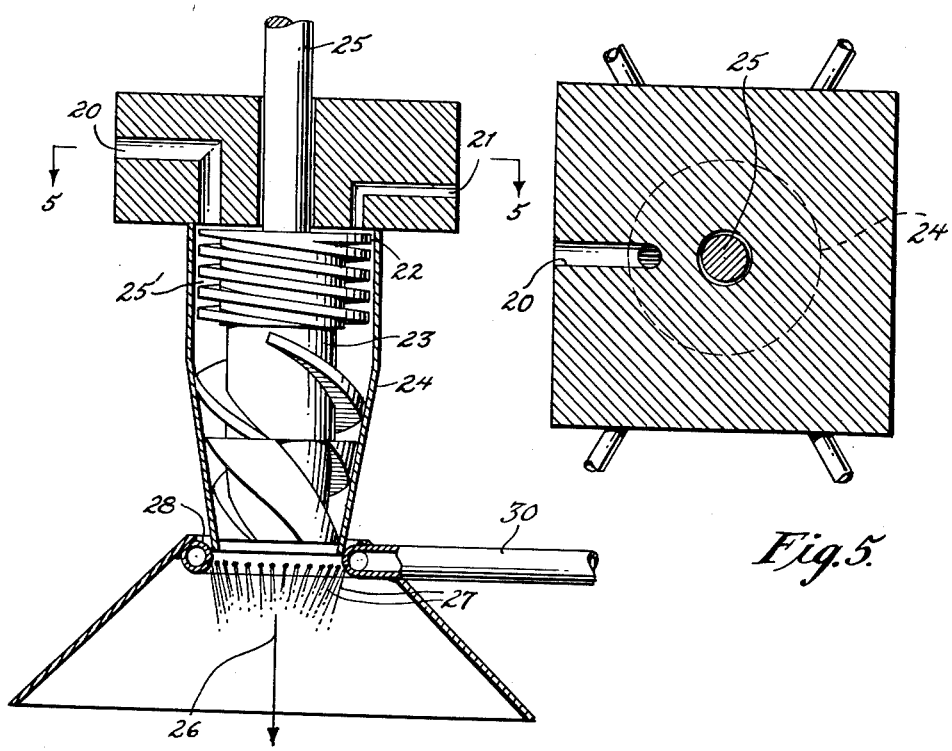
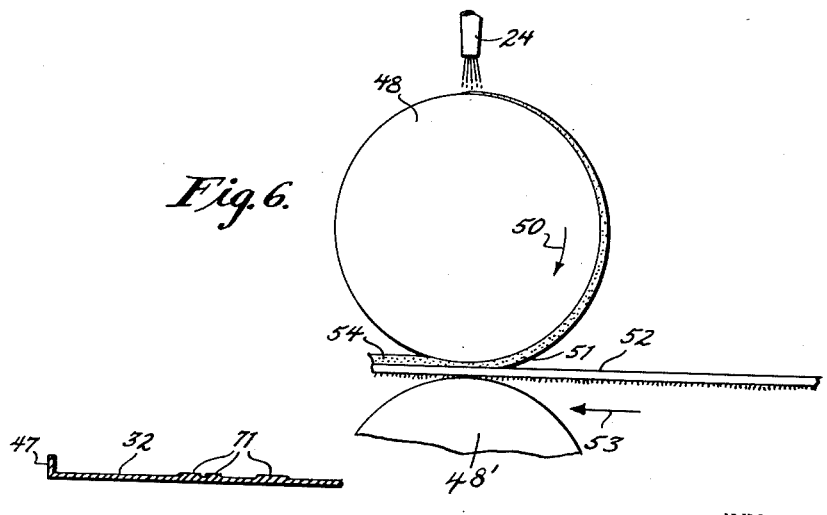
INVENTOR
KENNETH E. HANKINS
BY
ATTORNEYS July 24, 1962  K. E. HANKINS  3,046,177
METHOD OF APPLYING POLYURETHANE FOAM TO THE
BACKS OF CARPETS AND EQUIPMENT THEREFOR
Filed March 31, 1958  4 Sheets-Sheet 3

INVENTOR
KENNETH E. HANKINS
BY
ATTORNEYS

United States Patent Office 3,046,177
Patented July 24, 1962

3,046,177
METHOD OF APPLYING POLYURETHANE FOAM TO THE BACKS OF CARPETS AND EQUIPMENT THEREFOR
Kenneth E. Hankins, Carlisle, Pa., assignor to C. H. Masland and Sons, a corporation of Pennsylvania
Filed Mar. 31, 1958, Ser. No. 725,061
6 Claims. (Cl. 156—78)

The present invention relates to methods of applying polyurethane foaming compound to the back of carpets and the like and to apparatus therefor.

A purpose of the invention is to obtain more uniform distribution of relatively thin layers of polyurethane foam on the backs of carpets.

A further purpose is to secure a more resilient and more uniformly distributed resilient polyurethane foam on the back of a carpet.

A further purpose is to secure better adhesion between the back of a carpet and a polyurethane foam layer while at the same time accurately controlling the penetration of the polyurethane foam into the carpet.

A further purpose is to avoid the creation of polyurethane backing layers which have nodular portions.

A further purpose is to reduce shrinkage of polyurethane layers on the backs of carpets which will tend to make the carpets curl.

A further purpose is to avoid the necessity of applying a separate cementing layer to secure polyurethane foam to the back of a carpet.

A further purpose is to print on polyurethane layers applied to carpets.

A further purpose is to better control the distribution of polyurethane layers on contoured molds.

A further purpose is to avoid the necessity of slitting polyurethane stock.

A further purpose is to obtain smoother back on polyurethane layers applied to carpets.

Further purposes appear in the specification and in the claims.

In the drawings I illustrate mechanism which performs the process of the invention and which includes novel features, the form shown being chosen from the standpoints of convenience in illustration, satisfactory operation, and clear demonstration of the principles thereof.

FIGURE 4 is an enlarged diagrammatic axial section of the reaction mixer and dispenser employed in the preferred embodiment.

FIGURE 5 is an enlarged section of FIGURE 4 on the line 5—5.

FIGURE 6 is a view corresponding to FIGURE 1 showing a variation.

FIGURE 14 is a fragmentary transverse section of a modified mold.

Figure 1:
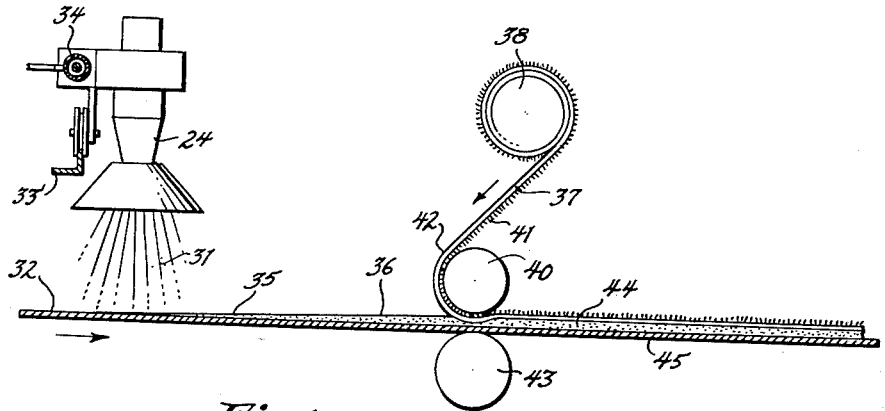
FIGURE 1 is a diagrammatic vertical section of one form of apparatus for use in the present invention.

Describing in illustration but not in limitation and referring to the drawings:

Efforts have been made in recent years to apply isocyanate or polyurethane foam of the reactive type to the back of carpets. Flexible polyurethane foams can be produced from a reaction of a diisocyanate such as 2,4 toluene diisocyanate, or 2,6 toluene diisocyanate or preferably a mixture of say 80 percent of 2,4 toluene diisocyanate and 20 percent of 2,6 toluene diisocyanate by weight, with a compound of suitably high molecular weight which contains the hydroxyl or ether group. The hydroxyl group is preferably a terminal hydroxyl group.

One example of such a hydroxyl compound is an alkyl resin polyester having a structural formula of the general character:

(1) 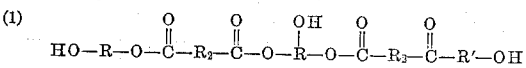

where R, R' and $R^2$ are alkyl groups involving a succession of $CH_2$ groups with an over-all carbon chain length of 10 to 30 carbon atoms in the monomer, and a molecular weight of the resin of the order of 1800. Polymerized castor oil is another suitable polyester.

Another hydroxyl compound which may be used is a polyoxypropylene glycol having the following typical structural formula:

(2) $HO—CH_2(CHCH_3OCH_2)_nCHCH_3OH$ where $n$ averages 2 to 34.

As a polyether, a suitable compound has a structural formula as follows:

(3) 

where $x$, $y$ and $z$ are high enough to give a molecular weight in the range from 2000 to 6000 and preferably about 2000.

Another suitable polyether has a typical structural formula as follows:

(4) 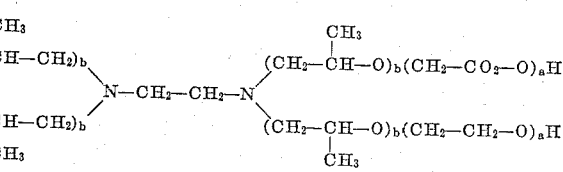

where $a$ and $b$ are high enough to give a molecular weight of 2000 to 6000 and preferably about 3500. It is preferable to use about 75 percent by weight of the compound of Formula 3 and 25 percent by weight of the compound of Formula 4 to react with the diisocyanate.

It is customary in the reaction of diisocyanate to use about 100 parts of the hydroxyl or ether compound to about 35 to 42 parts by weight of the diisocyanate, or mixture of diisocyanates.

It will be of course understood that other ingredients are well known to produce polyurethane reactive foam by generation of carbon dioxide in the reaction, and any one of these polyurethane reactive mixtures may be used in the present invention.

When reference is made herein to carpet it will be understood that any sheet fabric-like material is contemplated, whether woven, tufted, knitted, felted, cemented or otherwise, and that the fabric may be a carpet, rug, wall covering, floor covering, floor tile or the like.

Difficulty has been encountered in the prior art in the application of polyurethane reactive foam to such fabrics, and an important advantage of the present invention is that it overcomes such difficulties.

One of the most widely used methods of applying polyurethane foam on carpets has been to produce relatively thick slabs of cured foam and then slice the foam into sheets and cement the foam to the back of the carpet by means of an adhesive. The slicing of the sheets in large areas is a difficult and expensive operation, and the cost of the adhesive, its application and its combining are high. A further difficulty is that the slicing operation cuts through the cells of the slab of foam, leaving a relatively fragile and unattractive exposed surface showing numerous cut cell walls.

Efforts have been made by the present inventor and others to apply polyurethane foams to the backs of carpets by spraying. The results however have not been satisfactory. Very high air pressures have been required in order to mix the reactants and the catalysts, and the deposition of the film of foam on the back of the carpet under such high pressures has produced wavy formations, interfering with evenness of the deposit. The reacting ingredients have also caused frequent clogging of spray nozzles, so that maintenance has been a serious problem.

Furthermore the spraying operations have required expensive hooding and ventilating systems and created a hazard to health.

Efforts have been made to use conventional coating techniques such as doctor blades and roller coating on the back of carpets. However, the back of a fabric of the type of a carpet normally used has ridges and depressions, and this exposes a rough surface to the foam, which can only be smooth in normal practice by restraining the opposite surface of the foam as the foam expands. When the foam, however, is thus restrained it tends to form zones of varying density depending upon the ratio of weight to volume of the foam in the particular area, thus creating relatively firm nodules in certain areas and more resilient foam in other areas. As a consequence the variation in texture of the foam is highly objectionable when examining the felt from the back, and the variation in resilience is unsatisfactory when the carpet is walked on. Furthermore, the technique of using an apron is costly.

I have discovered that greatly improved application of polyurethane foam can be made to the back of carpet while reducing the cost and simplifying the procedure. In accordance with the present invention, foam is obtained which binds with the back of the carpet without the necessity of applying any additional adhesive, and controllably penetrates the back of the carpet without objectionably intruding into the pile. Furthermore the texture of the foam is greatly improved, with greater resilience and more rapid resilient response to restore the full dimensions after compression.

The invention also makes possible control of the cellular texture, and avoidance of gross cells with unyielding thick cell walls.

It is also possible in accordance with the present invention to impart printing or other information on the back of the polyurethane layer.

In accordance with the present invention, the polyurethane layer is deposited on a mold and the foaming cycle is allowed to come substantially to completion. Then the back of the carpet is brought into contact with the still tacky skin surface of the foam, so that the natural adhesion of the polyurethane causes intimate bonding between the foam and the back of the carpet. Since, however, the foam has already formed a firm though resilient body, it does not penetrate through the back of the carpet, and does not enter the pile except in the back where it assists in improving the tuft bind.

After the carpet has been brought in contact with the foam layer, an important aspect of the invention is to condition the cell structure while at the same time assuring intimate adherence between the back of the carpet and the foam. To do this, I compress the foam by pressing on the face of the carpet against the mold until the foam layer is reduced to about half of its finished thickness. Actually, this is about half of the foam thickness when it is fully expanded, with allowance for the slight penetration of foam into the back of the carpet. During this compression, the foam changes its cellular structure to break up the excessively fine cell walls which initially form. Instead of closed cells, an open intercommunicating cell structure is formed. As a result, the polyurethane layer becomes more resilient in the sense that it will more quickly restore its expanded dimension when pressure is released after curing. Furthermore the objectionable tendency to lateral shrinkage which otherwise exists and which causes the carpet to curl, is avoided.

The compressed polyurethane foam layer is released as soon as compression has been completed, as it is not desired to allow curing to occur while the foam is compressed. The polyurethane layer then expands to substantially its previous dimension, after which it cures either by natural curing at room temperature which takes place in a suitable aging time, for example of the order of 12 minutes, or by accelerated curing due to application of elevated temperature suitably of the order of 125 to 150° F. followed for example by heating at 250° F., the time being correspondingly short, suitably 4 to 5 minutes total, and only about a minute at 250° F.

In a preferred example of the present invention, polyurethane foam containing about 25% by weight of toluene diisocynate and about 75% by weight of polyethylene glycol, prereacted until approximately 8% of the diisocyanate remains free to react with the catalyst, is reacted under violent agitation suitably at about 3000 r.p.m. on a rotor having a diameter starting of the order of two inches and reducing to the order of ¾ inches with a catalyst preferably consisting of normal morpholine in the ratio of 2½ parts of water to 1½ parts of catalyst by weight (37 percent normal morpholine in the catalyst by weight, balance water), the quantity of prepolymer being preferably 900 grams to 45 grams catalyst including the water.

A stream of prepolymer liquid is suitably pumped (FIGURE 4) by a controlled volume pump suitably through valve opening 20 and the stream of catalyst is suitably pumped through valve opening 21 to enter the minute clearance space 22 between tapered rotating impeller 23 and cooperating tapered impeller housing 24, the impeller being driven at about 3000 r.p.m. by shaft 25 from a suitable motor not shown. The reaction begins to take place in the clearance space 22 and in fluted recesses 25' of the impeller as well known in the art.

A stream of reacting polyurethane foam 26 is discharged at the bottom of the reaction mixer and into this stream is projected a series of jets of gas 27 from an annular gas manifold 28, the jets being projected inwardly and forwardly into the stream. The gas will suitably be air, carbon dioxide or other suitable gas or steam introduced through pipe 30 into the manifold.

Figure 2:
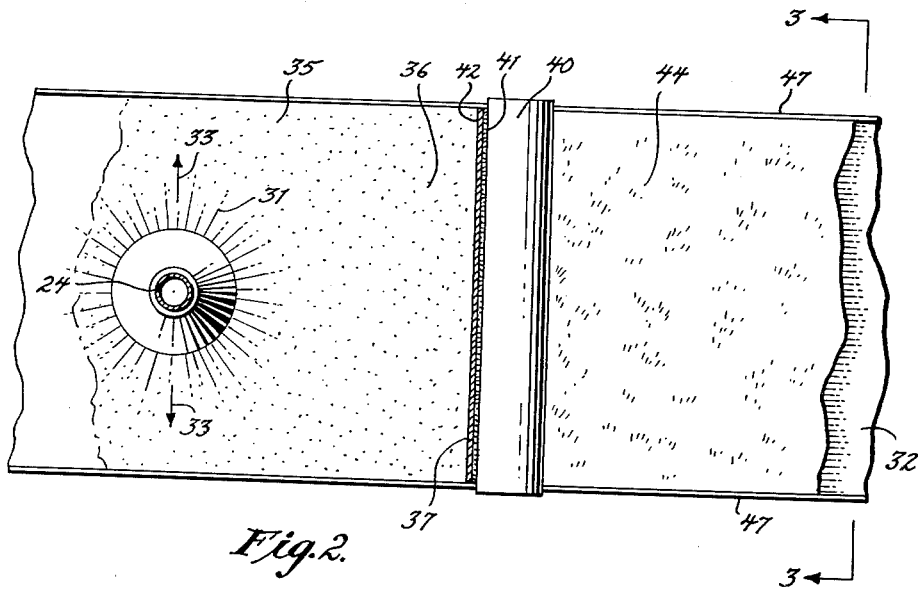
FIGURE 2 is a fragmentary diagrammatic plan view of the machine of FIGURE 1.
Figure 3:
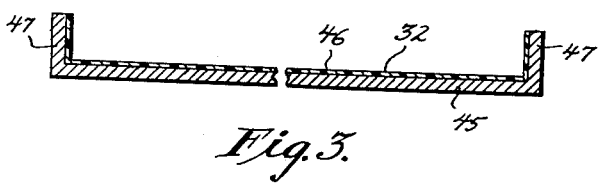
FIGURE 3 is a section on the line 3—3 of FIGURE 2.

The resulting polyurethane foam is discharged in a mass of globules 31 (FIGURE 1) downward on to a mold surface 32 which in FIGURES 1 to 3 is illustrated as a continually forwardly moving belt, suitably an endless belt, which is returned over belt tensioning rollers as well known. The dispenser is suitably moved transversely across the belt as indicated by arrows 33 on a suitable overhead track 33' under the action of a drive mechanism 34, in this case a pneumatic cylinder, and deposits a layer 35 of polyurethane foaming compound which is undergoing reaction and is freely exposed to the atmosphere. The foam layer progressively rises or extends at 36 without hindrance, until the foaming cycle is substantially complete. This step is important as it avoids creating areas of varied density and insures uniform texture throughout.

The time required for completion of the foaming cycle in the above example is suitably of the order of five minutes.

Carpet 37 from a suitable feed roll 38 is carried over an upper feed and pinch roll 40 with the pile 41 toward the roll and the back 42 brought into contact with the exposed upper surface of the polyurethane foam at a point at which the foaming cycle is complete. A cooperating pinch roll 43 is beneath the mold. Pressure is applied through the pile of the carpet, which presses the back of the carpet into engagement with the exposed surface of the polyurethane foam, causing sufficient penetration to intimately bind the still tacky upper skin surface of the foam to the carpet, causing the foam to penetrate the backing, but the pressure being insufficient to cause the foam to enter the pile of the carpet.

An important feature of the invention is that the pinch roll is set so as to cause the polyurethane layer to compress to about one half its final thickness, which also is about half the thickness of the polyurethane layer before it comes in contact with the carpet, except for the amount of penetration of the carpet back. This has the effect of causing most of the cells to foam a connecting structure instead of retaining separate cell walls. The resilience of the foam in the form of speed of recovery after load release is thus greatly increased. Immediately after the compression operation, the carpet is released and this restoration of full dimension at 44 is important as the polyurethane layer is now undergoing curing, which will be completed at room temperature in about 12 minutes or at a faster rate if heat is applied as already mentioned.

The pressure and pressure release accomplishes another result, as it assures that the tendency to lateral shrinkage of the foam which otherwise occurs will be overcome, thus avoiding the tendency to curl the carpet. It is important that the crushing of the polyurethane foam should not take place until after the foam has completed its foaming cycle, as early crushing would cause the foam to remain crushed and lose its gas completely.

It is important that the mold be capable of releasing from the polyurethane foam. The mold may be made desirably of a plastic having the tendency to release. A preferred mold as shown in FIGURES 1 to 3 is a belt of canvas, metallic mesh, or otherwise as shown at 45, or a sheet of polyethylene, having a polyethylene surface 46 exposed to the back of the polyurethane foam. A very desirable surface is made by employing a mixture of polyethylene (preferably A-C Polyethylene Grade 629, manufactured by Semet-Solvay Petrochemical Division, Allied Chemical and Dye Corporation) and a petroleum wax such as paraffin, preferably in the proportion of 40 to 75% by weight of polyethylene and the balance paraffin. The preferred composition contains 50% of polyethylene and 50% of paraffin by weight. The ingredients mix well at about 125° F. The mixture of polyethylene and paraffin has the advantage that it can be kept smooth by flame fusion from time to time, so that any difficulty through wear can be readily overcome.

The mold may also be made from polytetrafluoroethylene or other polyfluorethylene plastic such as Teflon.

The mold when in belt form desirably has belt shoulders 47 which assures that the polyurethane layer will not flow over the side.

In the alternate form of FIGURE 6, I illustrate a drum 48 rotating in the direction of the arrow 50 and receiving a deposit from the dispensing device 24 as already described at the top. The polyurethane layer is allowed to complete its foaming cycle until it foams to its full height at 51, and is then brought into contact with the back 52 of carpet moving in the direction of the arrow 53 under a pressure against a lower roll 48 which will compress and condition the polyurethane layer as already described and carry it off affixed to the back of the carpet for curing at 54. Any suitable edge seal will be provided.

The roll 48 is suitably coated with parting compound, such as the polyethylene composition already described.

In some cases it is preferable to apply the separate steps batchwise rather than continuously as shown in FIGURES 7 to 13 inclusive, as for example in applying polyurethane foam to the back of individual rugs or automobile mats.

In this case, where molded carpet is used, the mold 55 has a contour 56 which conforms to the contour of the automobile mat or the like, suitably having a hump 57. There is a suitable rim or shoulder 58 around the edge. The mold is coated with a parting compound at 60 as already described.

Figure 7:
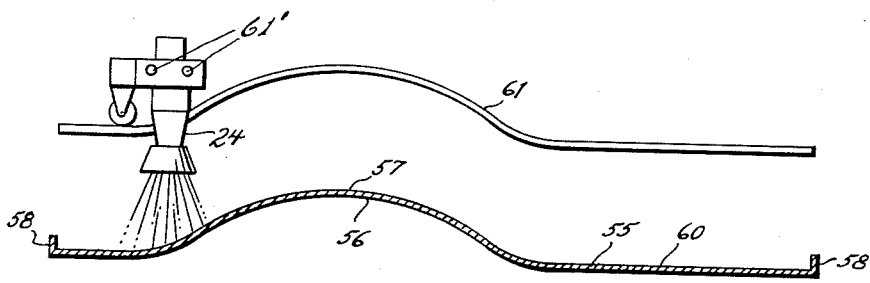
FIGURE 7 is a view corresponding to FIGURE 1 showing a further variation.
Figure 8:
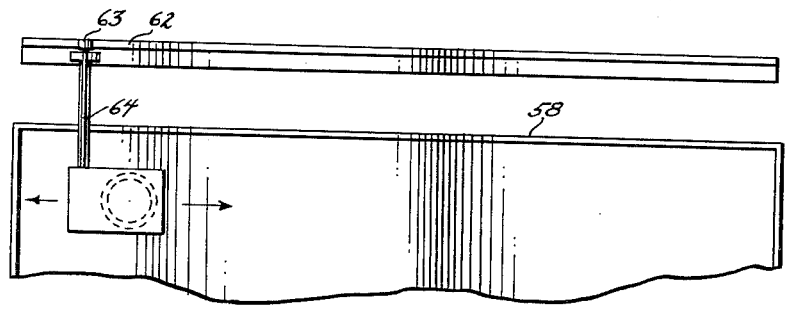
FIGURE 8 is a fragmentary plan view of FIGURE 7.

The dispenser 24 which discharges the foam desirably is manipulated on tracks 61 and moves laterally as required on support rods 61' (FIGURE 7). In order to avoid excessive deposit on high portions like the hump 57, a cam track 62 on which rides a roller 63 manipulates a control valve arm 64 which valves the passages 20 and 21 so as to reduce the amount of deposit on the hump (FIGURE 8) while increasing the valve opening at other positions. The gas or air at the nozzle aids in conveying the foam to the back of the carpet as a uniform thin layer.

Figure 9:
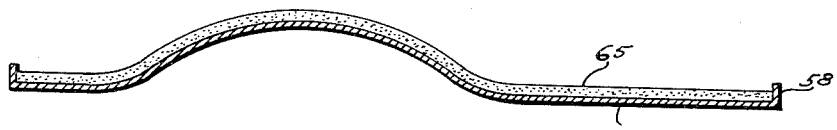
FIGURES 9 to 13 are views similar to FIGURE 7 showing steps in the process.

In the next step as shown in FIGURE 9, the layer of polyurethane is allowed to complete its foaming cycle at 65.

Figure 10:
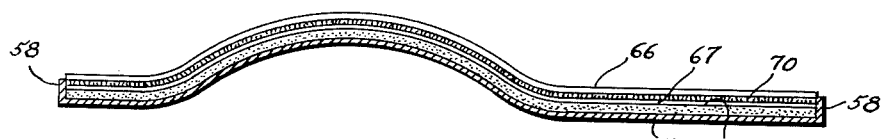

Then in the next step as shown in FIGURE 10 a mold head 66 having the contour corresponding to the mold introduces a piece of molded carpet 67 which is disposed with the back 68 downward and the pile 70 is held against the head 66 as by vacuum or other suitable means. In FIGURE 10 the carpet contacts the foam layer.

Figure 11:
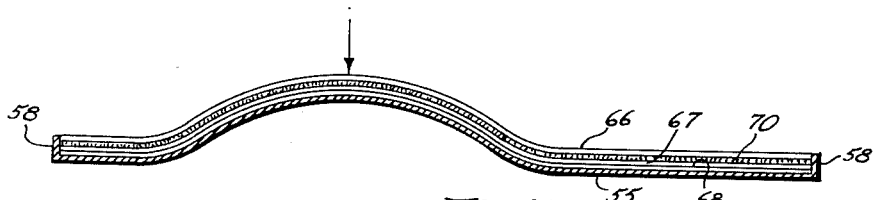

In FIGURE 11 the carpet is pushed down to compress the foam. The compression is adjusted so that the tacky skin on the exposed surface on the polyurethane layer binds to the back of the carpet and compresses the foam to about one half its final expanded thickness, causing the cells to interconnect and increasing the resilience, improving the bind to the carpet pile and removing the danger of shrinkage.

Figure 12:
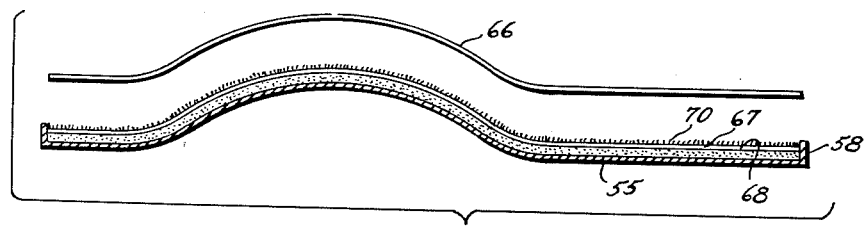
Figure 13:
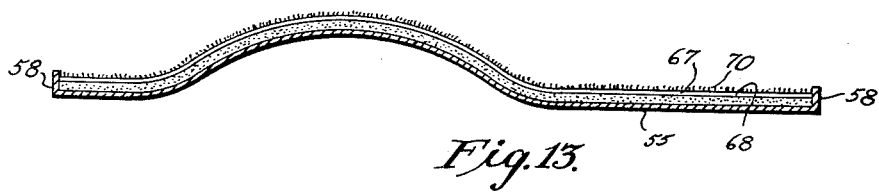

In the next step as shown in FIGURE 12, immediately after that of FIGURE 11, the mold head is removed, releasing the compression and allowing the polyurethane layer to expand to about twice the compressed height. Finally, as shown in FIGURE 13 the foam is cured or aged either at normal temperature or under elevated temperature as desired.

It will be evident that a very desirable feature of the invention is that an extremely pleasing appearance is produced on the back of the foam layer, since the cells are complete and open cell cavities are not exposed. Patterns are provided where desired by printing or the like, as by placing embossed or depressed letters or other representations as shown in FIGURE 14 in the mold at 71.

The skin is then continuous and can be shaped or deformed without breaking it.

Figure 15:
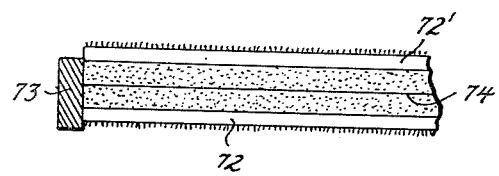
FIGURE 15 is a transverse section of a further modification of the invention.

In the alternate form of FIGURE 15, the mold is a layer of carpet 72 on which the polyurethane foam is deposited as in prior described methods, a deckle or side shoulder 73 holding the foam from flowing over the edges. A separate layer of carpet 72' is deposited on top, after the foam cycle is complete, and while the surface is still tacky, and the foam layer is then compressed to substantially one half its expanded thickness. This compression causes the cells to interconnect and increase the resilience, and upon the immediate release of the compressive force on the upper carpet 72', the polyurethane layer expands to its free height. A subsequent cut at 74 separates the foam into two layers, each adhering to one of the carpets.

The invention offers the advantage that waste is reduced, and no cost is involved for additional adhesive.

The invention makes possible a better quality of foam than was possible through the spraying method since better dispersion and reaction are obtained.

Since the foam is unrestrained during the foaming cycle, coarse thick walled cells are avoided and uniform layer thickness is obtained.

In view of my invention and disclosure variations and modifications to meet individual whim or particular need will doubtless become evident to others skilled in the art, to obtain all or part of the benefits of my invention without copying the method and apparatus shown, and I, therefore, claim all such insofar as they fall within the reasonable spirit and scope of my claims.

Having thus described my invention what I claim as new and desire to secure by Letters Patent is:

1. A method of mixing and distributing polyurethane foaming compound on a mold, using a rotating impeller within a housing, which comprises introducing, at an inlet end between the rotating impeller and the housing, a stream of polyurethane prepolymer and a separate stream of polyurethane catalyst, mixing together the prepolymer and the catalyst in the space between the impeller and the housing and there beginning the reaction between the prepolymer and the catalyst which causes the evolution of gas, discharging the reaction mixture as a mass out through an open forward end of the housing free from orifice action, and projecting jets of gas from a series of annular holes directed from the sides forwardly into the mass of reaction mixture after it leaves the forward end of the housing and thereby forming the mass of reaction mixture into a mass of globules which is distributed by the expanding gas from the jets over the surface of the mold.

2. Apparatus for reacting and distributing polyurethane foaming compound over a mold area, which comprises a housing having an inlet end and an open outlet end, a rotating impeller in the housing, having a clearance from the housing, means for introducing a stream of polyurethane prepolymer at the inlet end of the space between the housing and the impeller, means for introducing a stream of polyurethane catalyst at the inlet end of the space between the housing and the impeller, said impeller mixing the prepolymer and the catalyst and causing them to begin to react and discharging reaction mixture as a mass through the open outlet end of the housing, and a plurality of gas jet orifices forwardly directed in positions around the outlet end of the housing and adapted to discharge streams of gas into the polyurethane foam mixture to form the same into a mass of globules and distribute said globules evenly over the mold area.

3. A method of forming a layer of polyurethane foam on a mold surface, using a housing and a rotating impeller within the housing, which comprises introducing controlled amounts of polyurethane catalyst into an inlet end of the housing in the space between the housing and the impeller, mixing the prepolymer and the catalyst in the space between the housing and the impeller, discharging the reacting stream of liquid polyurethane foam out an opening at the forward end of the housing before the foam has reach full expansion, projecting gas from all sides from a series of jets, each of which is directed in a different direction, into the stream of polyurethane foaming compound after it has been discharged from the opening, each of the said jets detaching a portion of the stream of polyurethane foaming compound and forming it into globules of polyurethane foam and distributing it to a different part of the mold area, said gas jets by distributing the polyurethane globules to different locations on the mold cooperating to coat the mold surface evenly with the polyurethane foam.

4. A method of claim 3, which comprises then completing the foaming cycle of the polyurethane reaction mixture deposited on the mold, bringing the back of a carpet into engagement with the exposed surfaces of the still uncured polyurethane foam, applying pressure to the face of the carpet and compressing the polyurethane foam to a thickness approximately half its final thickness, releasing the pressure on the face of the carpet and allowing the polyurethane foam to expand, curing the polyurethane foam, and releasing the polyurethane foam from the mold surface.

5. In apparatus for reacting and distributing polyurethane foam, an impeller housing having an inlet end and a discharge opening at the opposite end, another impeller adapted to turn within the housing in spaced relation thereto, means for introducing controlled amounts of polyurethane prepolymer and polyurethane catalyst into the inlet end of the space between the housing and the impeller and thereby starting the reaction of the polyurethane reaction mixture which causes expansion of the same, a ring of gas jets around the forward end of the housing and forwardly directed, each of the gas jets being directed in a different direction and each being adapted to detach a portion of the reacting polyurethane foaming compound and distribute it to a different part of the mold in the form of globules of polyurethane foam, said gas jets cooperating to distribute the polyurethane foam relatively uniformly over the mold surface.

6. An apparatus of claim 5, in combination with means for applying the back of a carpet into engagement with the exposed surface of the uncured polyurethane foam in the mold, means for applying pressure to the surface of the carpet compressing the polyurethane foam to a thickness to approximately one half of the final thickness and means for curing the polyurethane foam after the pressure has been released.

References Cited in the file of this patent

UNITED STATES PATENTS

| 1,045,234 | Willis et al. | Nov. 26, 1912 |
| 1,897,173 | Long et al. | Feb. 14, 1933 |
| 1,907,600 | Smith | May 9, 1933 |
| 2,733,099 | Schlumberger | Jan. 31, 1956 |
| 2,745,141 | Brennan | May 15, 1956 |
| 2,764,565 | Hoppe et al. | Sept. 25, 1956 |
| 2,841,205 | Bird | July 1, 1958 |
| 2,843,563 | Bell | July 15, 1958 |
| 2,850,467 | Livingood | Sept. 21, 1958 |
| 2,865,046 | Bird | Dec. 23, 1958 |
| 2,950,221 | Bauer et al. | Aug. 23, 1960 |
| 2,956,310 | Roop et al. | Oct. 18, 1960 |
| 2,957,832 | Gmitter et al. | Oct. 25, 1960 |

FOREIGN PATENTS

| 1,154,376 | France | Oct. 28, 1957 |
| 1,154,377 | France | Oct. 28, 1957 |